(No Model.)

G. A. PADDOCK.
HARROW.

No. 252,135. Patented Jan. 10, 1882.

WITNESSES
F. M. Burnham.
E. P. Halstead

INVENTOR
G. Adolphus Paddock
By Daniel Breed Attorney

UNITED STATES PATENT OFFICE.

G. ADOLPHUS PADDOCK, OF TRENTON, WISCONSIN.

HARROW.

SPECIFICATION forming part of Letters Patent No. 252,135, dated January 10, 1882.

Application filed October 25, 1881. (No model.)

*To all whom it may concern:*

Be it known that I, G. ADOLPHUS PADDOCK, a citizen of the United States, residing at Trenton, in the county of Dodge and State of Wisconsin, have invented certain new and useful Improvements in Harrows; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

My invention consists of a novel construction of harrow, which will be understood by the following description and claim.

Figure 1:
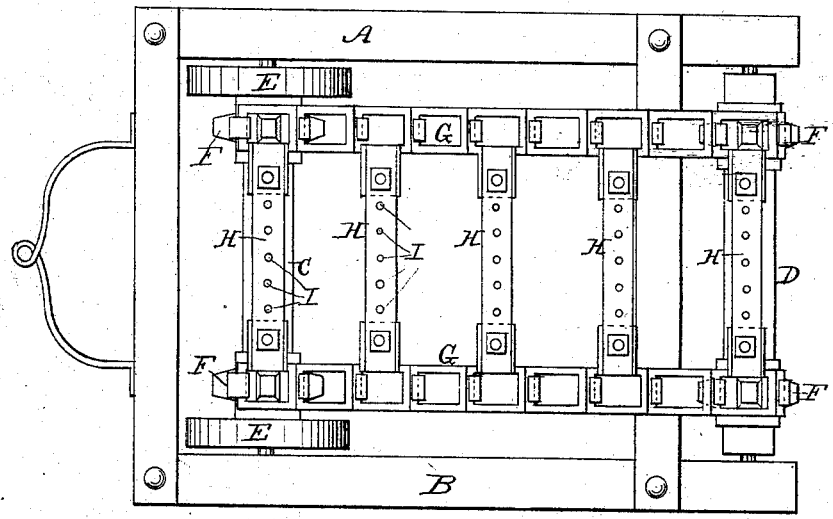
Figure 2:
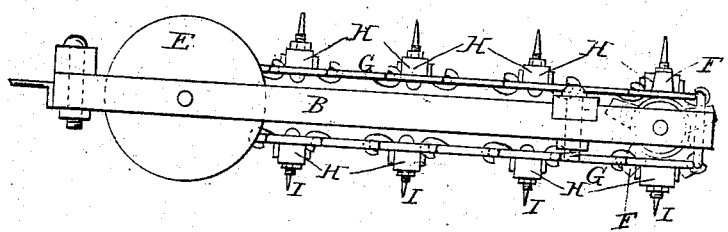

In the accompanying drawings, Figure 1 is a top view of my improved harrow. Fig. 2 is a side view of the same.

Upon a suitable frame, A B, are mounted two axles, C and D, the former being supported on traveling wheels E. Attached to the axles C and D are sprocket-wheels F, over which run two endless chains, G. These chains carry a series of drag-bars, H, provided with harrow-teeth I, as shown in Fig. 2.

By the above construction the chains and harrow-teeth revolve as the harrow is drawn over the ground, and yet the wheels E hold the chains and harrow-teeth in check, so as to properly work the ground.

This harrow will constantly clear itself of weeds and all kinds of trash, and the teeth cannot be broken by catching on stones or other obstructions.

Instead of endless chains, belts may be used as equivalents therefor.

Having described my invention, what I claim is—

The herein-described harrow, consisting of the frame A B, having mounted therein two axles, C D, the front axle, C, having supporting-wheels E, and sprocket-wheels F mounted thereon, and the rear axle also provided with sprocket-wheels, and endless chains passing over said sprocket-wheels, and carrying a series of drag-bars having teeth adapted to engage the ground, the several parts arranged relatively to each other, substantially as shown and described, whereby the endless chains are operated directly through the medium of the supporting-wheels, which also regulate their rotation, as specified.

In testimony whereof I affix my signature in presence of two witnesses.

G. ADOLPHUS PADDOCK.

Witnesses:
LORENZO D. LIVERMORE,
FRANK J. DOOLITTLE.